Patented Feb. 14, 1939

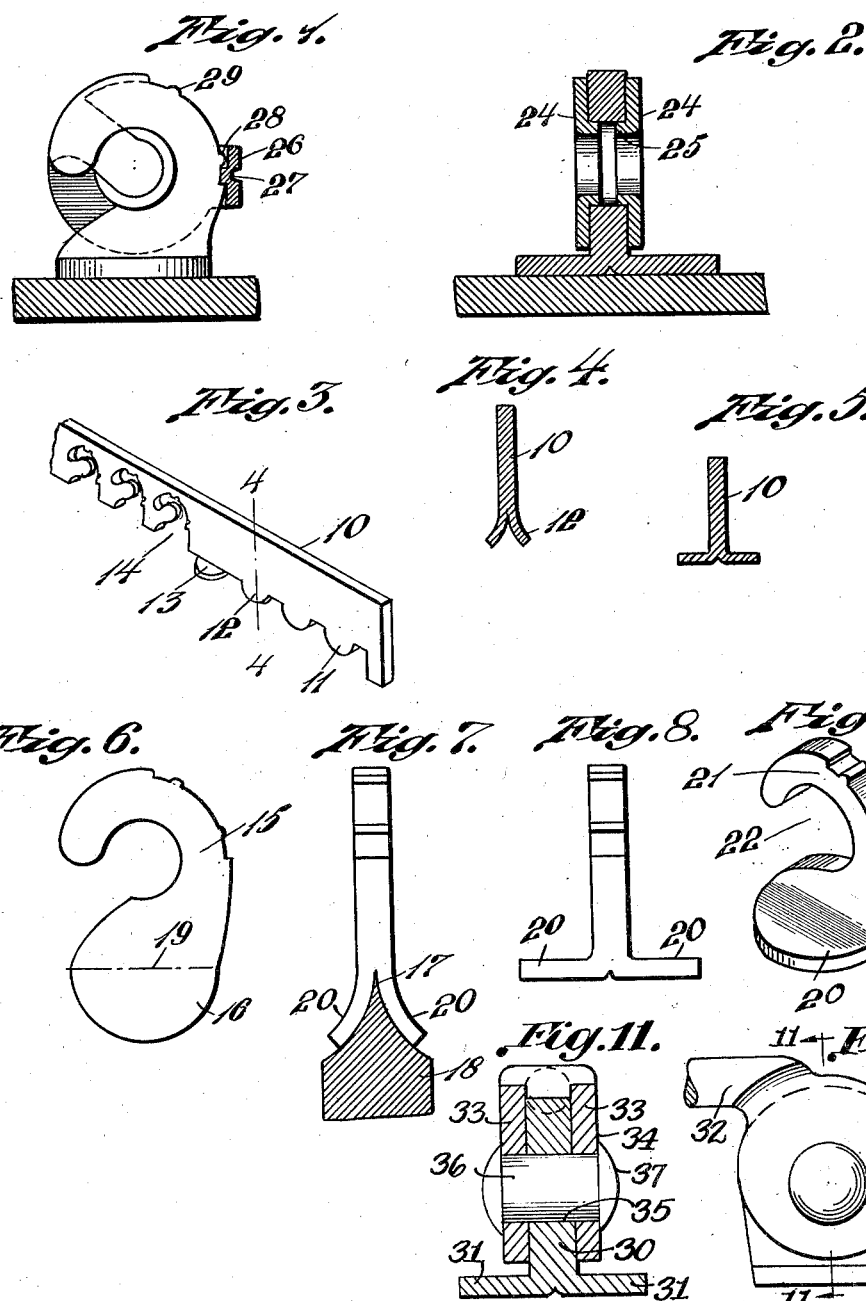

2,147,608

UNITED STATES PATENT OFFICE 2,147,608

CATCH OR JOINT

Eugene Morehouse, Providence, R. I., assignor to B. A. Ballou & Co., Inc., a corporation of Rhode Island Application July 6, 1937, Serial No. 152,172

1 Claim. (Cl. 24—160)

This invention relates to a finding more particularly to a catch or joint such as is used in the mounting of a pin stem in working position; and the invention has for one of its objects the provision of a base for such catch or joint which may be made of any desired size or shape for the presentation of a surface of a sufficient area to afford a strong solder attachment of the catch or joint to the part on which it is mounted.

Another object of the invention is to avoid the necessity of using a pad or separate piece to which the joint or catch is attached preliminary to soldering the part upon which it is ultimately desired that it be mounted.

Another object of the invention is the provision of a catch or joint of such form that it may be formed automatically by successive tool operations from a sheet of stock.

Another object of the invention is the provision of a catch which may be more easily soldered and will more readily stand up itself in position without tipping over.

With these and other objects in view, the invention consists of certain novel features of construction, as will be more fully described, and particularly pointed out in the appended claim.

In the accompanying drawing:

Fig. 1 is a section of a safety catch embodying this invention and the part to which it is attached;

Fig. 2 is a central sectional view at right angles to Fig. 1;

Fig. 3 shows a strip of stock which is preliminarily formed with the base of this improved invention before the shank portion is cut out from the strip;

Fig. 4 is a sectional view on line 4—4 of Fig. 3;

Fig. 5 is a view similar to Fig. 4 showing the base in its next station and completely bent before being severed from the bar;

Fig. 6 is a side elevation of the shank part of the catch before its base is formed;

Fig. 7 is a view at right angles to Fig. 6 and showing the slitting tool as cutting the base;

Fig. 8 is a view similar to Fig. 7 with the base bent to position;

Fig. 9 is a perspective view of the stationary part of the catch with the base bent to finished position;

Fig. 10 is a fragmental side elevation of a joint; and

Fig. 11 is a sectional view on line 11—11 of Fig. 10.

In the use of joints or safety catches until recently the same were made with a relatively small base, many being formed wholly or partly of gold where a saving of the material was of importance. Heretfore, in the use of joints or catches of this character hard soldering was used for attaching the base to the ornament or bar pin and the operation was entirely satisfactory. More recently alloys have been developed for more easy stone setting, which alloys would melt at a degree at which hard soldering would take place thus requiring a soft soldering at a lower temperature instead of a hard soldering operation, and this requires a greater holding area to get the strength required. Catches which were heretofore used consequently had to be hard soldered onto a little pad and the pad soft soldered in position in order that a greater area for the base might be provided to properly hold the catch or joint on the ornament. Further, the small joints or catches would frequently fall over when being used in soldering and the flux would get along the sides of the catches so that when soldering would occur the solder would run up the sides of the catch and cause a clumsy job and often interfere with the functioning of the device. Thus, it required great skill and care in the use of these catches to properly handle and manipulate them. With the use of a large base the tipping over of the joint or catch is less likely and in most cases eliminated.

Further, the solder does not have the opportunity to run about and over the top of the large base and additionally no separate pad need be used, thus eliminating one of the two soldering operations; and the following is a more detailed description of the present embodiment of this invention, illustrating the preferred means by which these advantageous results may be accomplished:

With reference to the drawing, 10 designates a strip of sheet stock from which the blanks for joints or safety catches may be formed, and when so formed the stock is first cut with a protuberance 11 of a desired shape and size. At one station such as 12 the scalloped edge is slit. At the station 13 the split projecting edge is bent outwardly at right angles, as shown in Fig. 3, and at station 14 the shank member is cut out in the desired shape from the blank in finished shape, these operations being conveniently formed in the order named from this bar of stock automatically and with tools, although they may be separately formed within the contemplation of this invention by cutting the shank from the stock first, and thereafter performing of the operation thereon.

I have illustrated in Fig. 6 the shank or non-rotatable part of the joint or catch designated 15 as blanked from sheet stock before being slit and bent with a downwardly extending portion 16. This downwardly extending portion 16 is substantially the length of the shank and is split as at 17 by a splitting tool 18 and thereafter the wing portions 20 are bent laterally outwardly in opposite directions by foldng along the line 19 to provide a base leaving the shank portion solid and of substantially the same thickness throughout its extent and double the thickness of the base. The under surface of the base will substantially conform to the surface to which it is to be attached, that here shown as being flat. This shank may be formed to receive a rotor or a pin stem joint or be of any suitable shape, that shown being illustrated as of a hook-shape 21 with an opening 22 for receiving the pointed end of a pin stem and cut away in its back as at 23 for the provision of a rotor having two ears 24 facing each other with inwardly extending projections 25, joined together by a bridge portion 26 having an inwardly bent portion 27 to snap over the lugs 28, 29 to hold the same in closed position, as shown in Fig. 1, or in open position when snapped over the lug 29.

By the arrangement here illustrated the portions 16 in Fig. 6 or 11 in Fig. 3 may be of any shape and of any desired extent so that when folded outwardly they will provide the desired area of base. These portions when bent outwardly are used entirely for the extent of base and are not tipped upwardly at their ends for any other purposes which would serve to decrease the area of the base, it being desired that a large base be provided and that all of the stock folded outwardly from the lower edge be utilized for this large base. Thus, a device is provided which will stand by itself and not easily tip over and also one which may be soldered without much danger of the solder running around the edge of the base and up into the mechanical moving parts of the device.

Where a pin stem joint structure is provided the mounting member or finding is constructed similarly to that for the catch, as previously described, and in Figs. 10 and 11 I have illustrated the shank 30 of a like solid structure which has had the downwardly extending portions split and folded outwardly as at 31 to provide the base the same as at portions 16 which are split and folded outwardly in connection with the catch. The pin stem 32 is of the type having ears 33 outwardly extending and folded downwardly to engage the opposite surfaces of the solid shank and body portion 30. These ears 33 are provided with an opening 34 which registers with the opening 35 in the body of the mounting, while a rivet pin 36 extends through the registering openings 34, 35 and is headed over as at 37 to maintain the pin in position. In this manner I provide end members for the pin stem, that is, the joint for the stem and also the catch for the pointed end of the stem.

The foregoing description is directed solely towards the construction illustrated, but I desire it to be understood that I reserve the privilege of resorting to all the mechancal changes to which the device is susceptible, the invention being defined and limited only by the terms of the appended claim.

I claim:

A finding comprising an upstanding solid shank of single thickness with a base of the same piece of material said base being of a length not substantially less than the length of the shank, and said base extending laterally in opposite directions from the shank to an indeterminate distance dependent upon the area of base desired with the entire lower surface on one side of the laterally extending portions of the base substantially conforming to the contour of the surface to which it is to be attached and said oppositely extending portions of the base being substantially the thickness of the shank if folded together to be in line with the shank.

EUGENE MOREHOUSE.